(12) United States Patent
MacDonald et al.

(10) Patent No.: US 12,046,881 B2
(45) Date of Patent: Jul. 23, 2024

(54) INTELLIGENT ELECTRICAL CONDUCTOR INSTALLATION SYSTEM

(71) Applicant: Sherman + Reilly, Inc., Chattanooga, TN (US)

(72) Inventors: Douglas Bruce MacDonald, Dawsonville, GA (US); Harby Carter Hollis, Chattanooga, TN (US); Ryan Arthur Berg, Hixson, TX (US); Matthew Caleb Faircloth, Wildwood, GA (US); Joshua Cooper Collins, Chattanooga, TN (US); Toni Corinne Tran, Chattanooga, TN (US)

(73) Assignee: Sherman + Reilly, Inc., Chattanooga, TN (US)

( * ) Notice: Subject to any disclaimer, the term of this patent is extended or adjusted under 35 U.S.C. 154(b) by 1015 days.

(21) Appl. No.: 16/964,913

(22) PCT Filed: Jan. 28, 2019

(86) PCT No.: PCT/US2019/015350
§ 371 (c)(1),
(2) Date: Jul. 24, 2020

(87) PCT Pub. No.: WO2019/148068
PCT Pub. Date: Aug. 1, 2019

(65) Prior Publication Data
US 2021/0044093 A1    Feb. 11, 2021

Related U.S. Application Data

(60) Provisional application No. 62/622,534, filed on Jan. 26, 2018.

(51) Int. Cl.
*H02G 1/04* (2006.01)
*H02G 7/02* (2006.01)

(52) U.S. Cl.
CPC .............. *H02G 1/04* (2013.01); *H02G 7/02* (2013.01)

(58) Field of Classification Search
CPC .. H02G 1/02; H02G 1/04; H02G 1/06; H02G 1/08; H02G 11/02; H02G 7/10
See application file for complete search history.

(56) References Cited

U.S. PATENT DOCUMENTS

2007/0158093 A1    7/2007   Barthold
2014/0136140 A1    5/2014   Chan et al.
(Continued)

FOREIGN PATENT DOCUMENTS

| CN | 102288223 A | * 12/2011 |
| CN | 102288223 A | 12/2011 |
| CN | 203951578 U | 11/2014 |

OTHER PUBLICATIONS

Examination Report in related EP Application No. 19704179.1, mailed Apr. 28, 2023.
(Continued)

Primary Examiner — Tyrone V Hall, Jr.
(74) *Attorney, Agent, or Firm* — Troutman Pepper Hamilton Sanders LLP; Ryan A. Schneider; Korbin M. Blunck (57) ABSTRACT

An intelligent electrical conductor installation system includes a puller sub-system, a tensioner sub-system, and a running board. The pull sub-system is configured to provide a pulling force to a pull rope connected on one end to the running board. The tensioner sub-system is configured to provide tension to the one or more conductors connected to the running board during installation of the conductors. The running board is connected to the pull rope on a first end, and configured to be connected to one or more conductors on a second end, wherein the running board includes one or more
(Continued)

sensors configured to sense attributes of the conductor pull operation.

54 Claims, 5 Drawing Sheets

(56)  References Cited

U.S. PATENT DOCUMENTS

2015/0068318 A1\*  3/2015  Bardin .................... G01L 5/047
                                                          73/828
2019/0288496 A1\*  9/2019  Hansen .................... G01L 5/042

OTHER PUBLICATIONS

94(3) EPC European Examination Report in related EP Application No. 19704179.1, mailed Aug. 17, 2021 (7 pages).
International Search Report in PCT Application No. PCT/US2019/015350 mailed Apr. 1, 2019.
Written Opinion in PCT Application No. PCT/US2019/015350 mailed Apr. 1, 2019.

\* cited by examiner

FIG. 5

INTELLIGENT ELECTRICAL CONDUCTOR INSTALLATION SYSTEM

TECHNICAL FIELD

This invention relates generally to electrical conductor installation systems, and in particular to intelligent installation systems.

BACKGROUND

The installation of power transmission lines, sometimes referred to as "pulling conductors", utilizes a number of components spread over a wide area. For example, in some embodiments the length of the conductor being pulled/installed is over a mile long. The conductors are attached to a running board, which in turn is attached to a pull rope that pulls the running board and conductors through the plurality of blocks on which the conductors will be installed. A puller sub-system is positioned on one end of the installation site, and is configured to apply a pull force via a pull rope attached to the running board. On the opposite end of the installation site is a tensioner sub-system, configured to apply a tension force to the conductors attached on one end to the running board. The pull force applied by the puller sub-system is opposed by the tension force applied by the tensioner sub-system, wherein the respective pull force and tension force are controlled to selectively pull the running board through the plurality of blocks associated with the transmission towers towards the puller sub-system, thereby installing the conductors onto the plurality of blocks.

However, the conductor pull requires a spotter to follow the running board and provide feedback to the puller and/or tensioner each time the running aboard approaches the next block. For example, if the orientation of the running board (e.g., pitch, yaw, etc.) is incorrect, the running board may hit the block causing tension on the conductor to increase, in some cases causing damage to the pole/tower and/or to the conductor itself. Similarly, if one or more bearings associated with one of the plurality of blocks fail, the tension on one or more of the conductors can increase dramatically, causing the conductor to fail and/or break.

Depending on terrain, in some cases spotters may be unable to monitor the running board during a pull operation. For these reasons, it would be beneficial to provide a conductor installation system that provides technicians with information and/or feedback regarding a pull operation.

SUMMARY

According to some embodiments, an intelligent electrical conductor installation system includes a puller sub-system, a tensioner sub-system, and an intelligent running board. The pull sub-system is configured to provide a pulling force to a pull rope connected on one end to the running board. The tensioner sub-system is configured to provide tension to the one or more conductors connected to the running board during installation of the conductors. The running board is connected to the pull rope on a first end, and connected to one or more conductors on a second end, wherein the running board includes one or more sensors configured to sense attributes of the conductor pull operation.

According to some embodiments, a running board includes a front end, a rear end, at least one sensor and a communication module. The front end is configured to be connected to a pull rope and the back end is configured to be connected to one or more conductors. The at least one sensor is configured to collect data related to operating condition of the running board. The communication module and/or antenna are configured to communicate collected sensor data to a remote monitoring device.

According to some embodiments, a block configured to receive and support one or more conductors utilized in a power transmission line includes a plurality of sheaves, a plurality of bearings, one or more sensors and a communication module. The plurality of sheaves are configured to receive and support the one or more conductors. The plurality of sheaves are mounted on the plurality of bearings to allow the sheaves to rotate in response to the one or more conductors being pulled across the block. The one or more sensors are configured to monitor temperature of one or more of the plurality of bearings and the communication antenna communicate the monitored temperature to a remote monitoring center.

DETAILED DESCRIPTION

This disclosure describes an intelligent electrical conductor installation system utilized to pull conductors for above-the-ground electrical power transmission lines. At one end of the installation site, a puller sub-system provides a pulling force to a pull rope connected to a running board. At the opposite end of the installation site, a tensioner sub-system provides tension to the one or more conductors also connected to the running board. The pull force applied by the puller sub-system is opposed by the tension force applied by the tensioner sub-system, wherein the respective pull force and tension force are controlled to control the pull of the running board through the plurality of blocks associated with the transmission towers towards the puller sub-system.

According to some embodiments of the present invention, the running board includes a plurality of sensors that collect data regarding the operational status of the running board during the conductor pull operation. For example, in some embodiments the running board sensors include one or more of a video sensor, a positioning sensor, a speedometer, one or more tension meters, a proximity sensor, identification sensor, and/or orientation sensors. Data from the one or more sensors is communicated via wired and/or wireless communication means to a monitoring station for display to a technician and/or storage for subsequent review.

Figure 1:
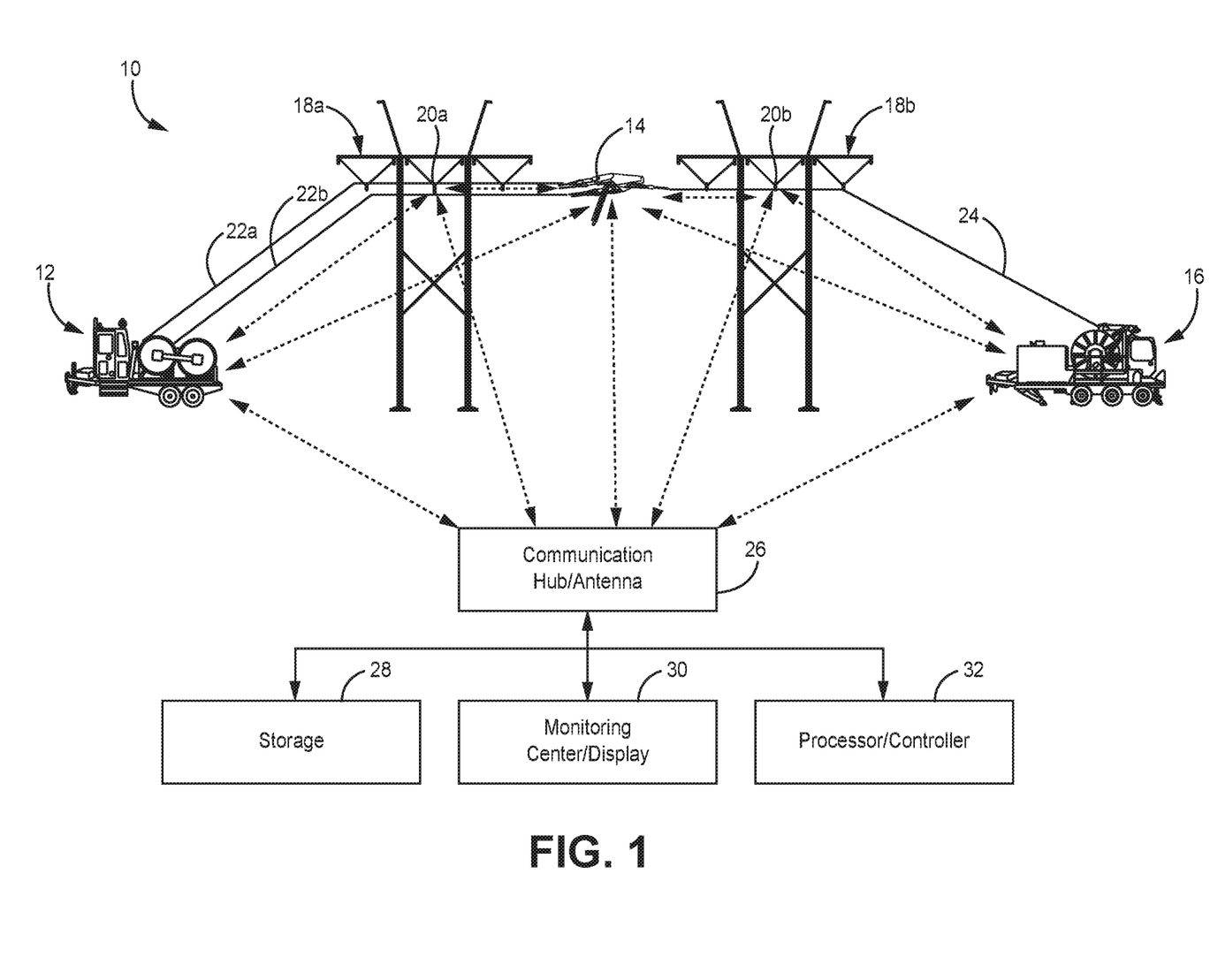
FIG. 1 is a simplified diagram of an intelligent electrical conductor installation system.

FIG. 1 is a simplified diagram of an intelligent electrical conductor installation system (hereinafter, "the system") 10.

In some embodiments, the system 10 includes a tensioner sub-system 12, intelligent running board 14, puller sub-system 16, plurality of power transmission towers/poles 18a, 18b, one or more blocks 20a, 20b associated with each power transmission pole, one or more conductors 22a. 22b, a pull rope 24, a communication hub/antenna 26, a storage module/device 28, a monitoring center/display 30, and a processor controller 32.

In some applications, the plurality of power transmission towers/poles extend over a distance of multiple miles (e.g., 4-5 miles). Prior to the installation, pull rope 24 is extended and strung through the plurality of blocks (e.g., 20a, 20b) associated with each of the plurality of power transmission towers/poles 18a, 18b. The intelligent running board 14 is connected to the pull rope 24 at a location near to tensioner sub-system 12. Similarly, the one or more conductors (e.g., 22a, 22b) to be installed are connected to the intelligent running board 14. At this point in the conductor pull operation, the running board is pulled through the plurality of blocks 20a, 20b associated with each of the plurality of power transmission towers/poles 18a, 18b, thereby installing the conductors into place along the plurality of blocks 20a. 20b spanning the distance between the puller sub-system 16 and the tensioner sub-system 12. More particularly, the pulling sub-system includes a motor that provides a pulling force to pull rope 24. The tensioner sub-system 12 applies an opposite force (e.g., a tensioning force) that opposes the pulling force applied to pull rope 24 to maintain tension in conductors 22a. 22b, while allowing the conductors to be pulled through the plurality of blocks towards the pulling sub-system 16. In some embodiments, the tensioner sub-system 12 applies tension separately to each of the plurality of conductors 22a. 22b being pulled. As described in more detail below, the orientation (e.g., pitch, yaw, roll) of intelligent running board 14 is controlled to allow the running board 14 to "fly" through the opening in each of the plurality of blocks 20a, 20b. In addition, the orientation of the intelligent running board 14 depends, at least in part, on the tension applied to the one or more conductors 22a, 22b. As a result, the orientation of intelligent running board 14 can be controlled by modifying the tension applied to one or more of the one or more conductors (e.g., 22a, 22b).

In some embodiments, intelligent running board 14 includes one or more sensors configured to collect data related to the pulling operation. In some embodiments, the one or more sensors include one or more of visual sensors (e.g., camera, video), positioning sensor (e.g., satellite navigation systems, radio-based navigation systems, cellular-based navigation systems, or other positioning systems), speedometer and/or positioning sensor capable of determining speed, tension meters capable of monitoring pulling and/or tensioning forces on the running board 14, proximity sensors capable of detecting distance to a structure (e.g., blocks 20a, 20b), RFID sensors, and/or orientation sensors (e.g., inertial sensors, such as accelerometer, gyroscope, etc.).

The intelligent running board 14 is configured to communicate with one or more of the tensioner sub-system 12, the puller sub-system 16, and/or the communication hub/antenna 26. Communication may be unidirectional or bi-directional. In some embodiments, communication is wireless, and may utilize one or more wireless standards and/or telecommunications standards. Examples of wireless communication protocols include WiMax utilized for long-range communications, WiFi (e.g., 802.11) utilized for medium-range communications, and Bluetooth, Zigbee, etc. utilized in short-range applications. Examples of telecommunications standards includes the long-term evolution (LTE) standard and/or 3G standard. In other embodiments, other available wireless communications standards may be utilized to communicate data sensed by the one or more sensors to tensioner sub-system 12, puller sub-system 16, and/or communication hub/antenna 26.

In some embodiments, intelligent running board 14 is configured to communicate with the tensioner sub-system 12 using a wired communication protocol in which one or more conductors 22a, 22b and/or another dedicated data communication cable (not shown) pulled by running board 14 is utilized to communicate data captured by the one or more sensors located on the intelligent running board 14. For example, in some embodiments a cable (e.g., coaxial, fiber optic, etc.) is connected between the intelligent running board 14 and the tensioner sub-system 12, in which the cable is pulled along with conductor 22a, 22b by intelligent running board 14. Similarly, in some embodiments a data communication cable (e.g., coaxial, fiber optic, etc.) is connected between intelligent running board 14 and the puller sub-system 16 for communicating data captured by the one or more sensors located on the intelligent running board 14. In some embodiments, the pull rope 24 is similarly equipped with a data communication cable to allow the running board to communicate via a wired connection with the puller sub-system 16. In other embodiments, a dedicated data communication cable is provided between the running board 14 and the puller sub-system 16 in addition to pull rope 24.

In some embodiments, intelligent running board 14 is also configured to communicate wirelessly with the one or more blocks 20a, 20b associated with each power transmission tower/pole. In some embodiments, blocks 20a, 20b include one or more sensors configured to collect data related to the pulling operation. For example, in some embodiments it may be beneficial to establish communication between the running board 14 and one or more of the plurality of blocks 20a, 20b, to detect the running board clearing each of the plurality of blocks. In one embodiment, each of the plurality of blocks includes proximity sensor or tag (e.g. RFID tag, near field communication sensor, etc.) that is configured to be detected by running board 14. For example, in some embodiments each of the plurality of blocks 20a, 20b is configured with a unique RFID tag that can be read by an RFID sensor located on running board 14, allowing running board 14 to detect clearing each of the plurality of blocks 20a, 20b. In addition to detecting clearance of running board 14, in some embodiments the one or more sensors includes a temperature sensor configured to measure heat associated with the bearings utilized by blocks 20a, 20b to predict bearing failure or detect faulty bearings. In some embodiments, each of the blocks is configured to communicate wirelessly with one or more of the tensioning sub-system 12, running board 14, pulling sub-system 16, and/or communication hub/antenna 26.

In some embodiments, tensioner sub-system 12 is configured to communicate directly with puller sub-system 16, allowing sensor data captured by both the tensioner sub-system 12 and puller sub-system 16 to be shared between the sub-systems. In addition, one of the sub-systems may be equipped to communicate wirelessly or via wired communications with the running board 14 to acquire sensor data from the running board. In addition to communicating with one another, in some embodiment puller sub-system 16 and/or tensioner sub-system 12 are configured to communicate with communication hub/antenna 26, via either wired or wireless communication means. In some embodiments, communication hub/antenna 26 is located proximate to the tensioner sub-system 12, while in other embodiments is located proximate to the puller sub-system 16. In still other embodiments, communication hub/antenna 26 is remotely located with respect to both the tensioning sub-system 12 and the pulling sub-system 16.

In some embodiments, communication hub/antenna 26, storage 28, monitoring center/display 30, and processor/controller 32 are included as part of a computer system (e.g., computer, laptop, tablet, etc.). In other embodiments, each of communication hub/antenna 26, storage 28, monitoring center/display 30 and processor/controller 32 are separate elements, connected to communicate with one another via either wired or wireless communication. For example, in some embodiments, storage medium 28 may be implemented by a server connected to receive data from communication hub/antenna 26, which in turn is connected to receive data from one or more of the tensioner sub-system 12, the intelligent running board 14, and/or the puller sub-system 16. Stored data can subsequently be reviewed by technician, installer, manager, etc. to monitor aspects of the installation. For example, in some embodiments, it is important to determine the tension applied to the respective conductors 22a, 22b, as tension above a threshold value can be detrimental to the performance of the conductor.

In some embodiments, sensor data received by communication hub/antenna 26 is communicated to monitoring center/display 30 for display. For example, as shown below in FIG. 5, in some embodiments video data captured from a video sensor located on running board 14 is displayed to monitoring center/display 30. In some embodiments, additional data may be displayed including one or more of speed of running board 14, position (both absolute and relative to structures), tension, orientation, induced voltage, etc. As described above, in some embodiments monitoring center/display 30 is located at tensioner sub-system 12, puller sub-system 16, both tensioner sub-system 12 and puller sub-system 16, or located remotely. In some embodiments, by providing an operator/technician with a real-time view of sensor data, the operator/technician utilizes the data to adjust one or more attributes of the conductor pull, such as conductor tension on one or more of the conductors 22a, 22b, pull force applied, etc. Similarly, in some embodiments monitoring center/display 30 is implemented as part of a mobile device such as a tablet, smartphone, laptop, etc. that can be utilized by a technician/manager to monitor the conductor pull operation.

In some embodiments, sensor data received at communication hub/antenna 26 is provided to processor/controller 32 for processing. For example, in some embodiments, sensor data received from a plurality of sensors are combined by processor/controller 32 to draw conclusions or provide predictive analysis of the conductor pull operation. For example, in some embodiments, a sudden increase in tension either upon entering or clearing one of the plurality of blocks 20a, 20b in combination with information on the pulling force applied by the puller sub-system 16 and tension applied by the tensioner sub-system 12 allows processor/controller 32 to detect a failing bearing associated with one of the plurality of blocks 20a, 20b.

In this way, the intelligent electrical conductor installation system 10 provides a system that allows for the collection, distribution, and utilization of sensor data for real-time control of the conductor pull operation and subsequent analysis (e.g., non-real-time) of the conductor pull operation.

Figures 2A, 2B:
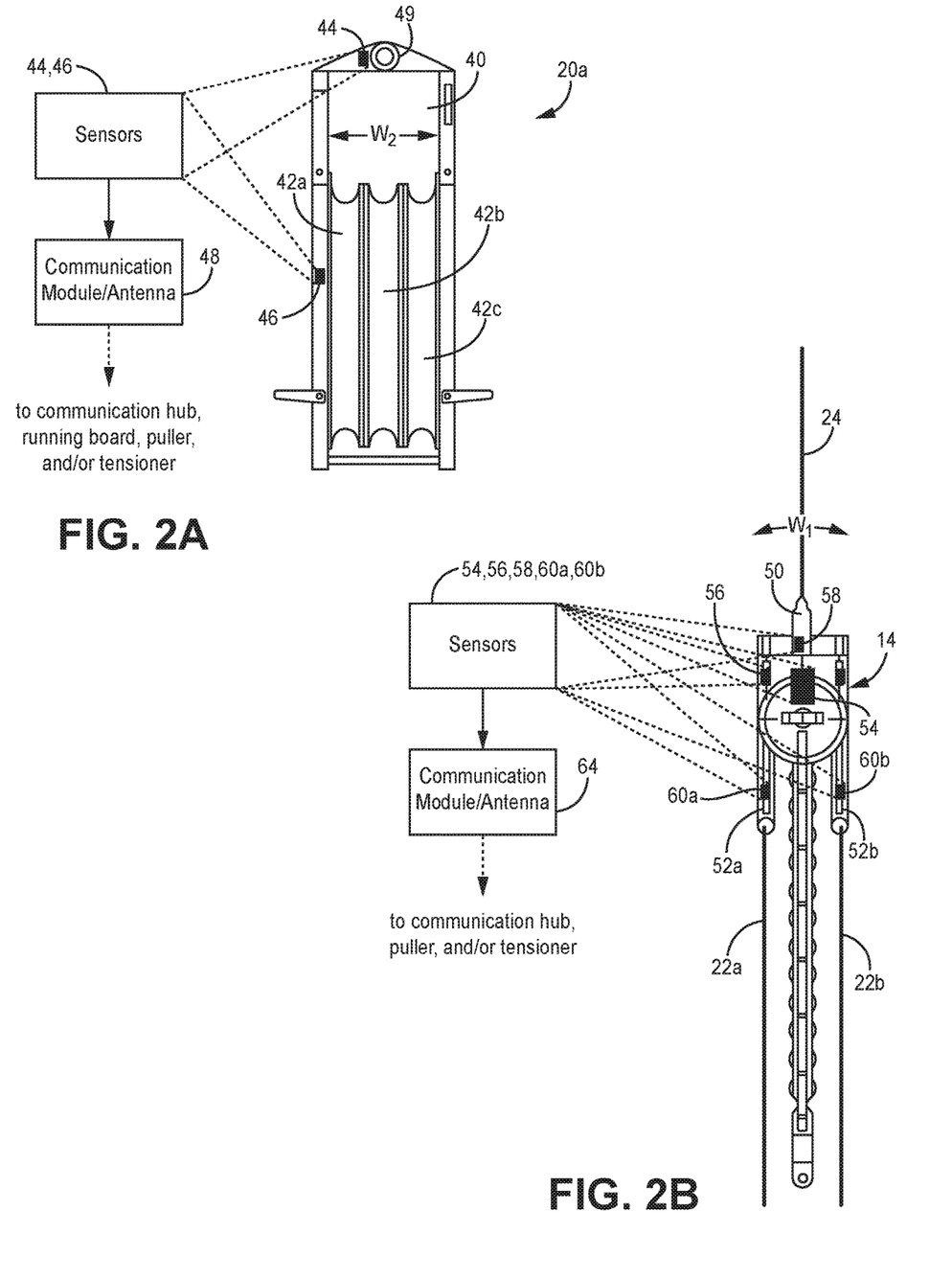
FIG. 2A is a side view of a block associated with a transmission pole/tower that receives the running board and one or more conductors.
FIG. 2B is a top view of a running board connected on one end to a pull rope and on the other end to one or more conductors.

FIG. 2A is a side view of a block associated with a transmission pole/tower that receives the running board and one or more conductors, FIG. 2B is a top view of a running board connected on one end to a pull rope and on the other end to one or more conductors. As illustrated by the orientation of FIGS. 2A and 2B, the width $w_1$ of running board 14 is approximately equal to or slightly less than the interior width $w_2$ of block 20a, allowing running board 14 to "fly through" the opening 40 of the plurality of blocks 20a, 20b. In the embodiment shown in FIG. 2A, each block 20a, 20b includes hanger portion 49 utilized to suspend blocks 20a, 20b from the respective transmission tower 18a, 18b, respectively. In addition, in the embodiment shown in FIG. 2A, each block 20a, 20b includes a plurality of sheaves 42a and 42c configured to receive electrical conductors 22a and 22b pulled by running board 14, and a sheave 42b configured to receive pull rope 24 utilized to pull running board 14 during the pull operation. In other embodiments, blocks 20a, 20b may be configured to include more or fewer sheaves. For example, in one embodiment, each block 20a, 20b includes a single sheave configured to receive both the pull rope 24 and the electrical conductor 22.

In some embodiments, the one or more sheaves 42a, 42b, 42c are mounted on bearings that allow each of the sheaves to rotate relative to the stationary block 20a, 20b. When operating well, the bearings utilized to support the sheaves 42a, 42b, and 42c reduce the overall friction associated with pulling the pull rope 24 and conductors 22a, 22b through the plurality of blocks 20a, 20b. One possible source of increased tension on conductors 22a, 22b are failing or failed bearings. In some embodiments, bearing operation is monitored via one or more sensors 46 mounted on each of the plurality of blocks 20a, 20b. For example, in one embodiment the sensor is a temperature sensor mounted adjacent to the bearing component that monitors and provides sensor data related to bearing temperature, wherein bearing temperature may be utilized to detect and/or predict bearing failure. In other embodiments, rather than a temperature sensor, other types of sensors may be utilized to monitor bearing operation, including one or more of acoustic sensors, vibration sensors (e.g., accelerometers), or other bearing operation sensors. Data captured by sensors 46 are provided to communication module/antenna 48 for communication to one or more of communication hub 26, running board 14, puller sub-system 16, and/or tensioner sub-system 12. In some embodiments, each of the plurality of blocks 20a, 20b is configured to communicate captured sensor data to running board 14, which is then responsible for communicating the sensor data to one or more of communication hub 26, puller sub-system 16, and/or tensioner sub-system 12. This may be more cost effective than configuring the plurality of blocks 20a, 20b with the capability to communicate individually with communication hub 26, puller sub-system 16, and/or tensioner sub-system 12, as the running board 14 can be equipped with the communication module/antenna required to communicate data onto the ground and is utilized in each pulling operation, while each of the plurality of blocks 20a, 20b remains a part of the transmission line system even after the conductor pull operation is complete.

In addition to sensors 46 utilized to monitor bearing operation, each of the plurality of blocks 20a, 20b may include one or more additional sensors 44 utilized to monitor operational conditions associated with the conductor pull operation. For example, in some embodiments, sensor 44 is a proximity sensors utilized in conjunction with sensors located on running board 14 to detect the proximity of running board 14 to each of the plurality of blocks 20a, 20b. Detecting the proximity of running board 14 to each of the plurality of blocks 20a, 20b is beneficial as it allows operators/technicians to control (e.g., slow) the speed of the pull operation as running board 14 approaches each block 20a, 20b. In some embodiments, the proximity sensor is implemented using an RFID sensor—RFID tag or reader—in conjunction with RFID sensor (tag or reader) located on running board 14 to detect when running board has successfully traversed a block 20a, 20b. In the embodiment shown in FIG. 2A, RFID tag/reader is located on the portion of block 20a, 20b connected to the power transmission tower 18a, 18b, respectively. In other embodiments, sensor 44 may include other sensors configured to detect sensor data relevant to the conductor pull operation.

In the embodiment shown in FIG. 2B, running board 14 includes a swivel 50, conductor connectors 52a, 52b, and a chain. Swivel 50 connects running board 14 to pull rope 24. Conductor connectors 52a, 52b connect running board 14 to conductors 22a and 22b, respectively. In other embodiments, additional or fewer conductor connectors 52a, 52b are utilized depending on the number of conductors being pulled at one time. During a conductor pull operation, a pull force is applied to pull rope 24, which results in running board 14 and conductors 22a, 22b being pulled through the plurality of blocks 20a, 20b.

In the embodiment shown in FIG. 2B, running board 14 includes one or more sensors utilized to collect data related to the pull operation. The one or more sensors include sensors such as a video sensor, a positioning sensor, a speedometer, one or more tension meters, a proximity sensor, identification sensor, and/or orientation sensors. In one embodiment, video sensor 54 is located on a top or bottom surface of running board 14 and is oriented in the direction of travel of running board 14 (i.e., toward pull rope 24) such that the image(s) captured by video sensor 54 allow a technician operator to see approaching objects (e.g., blocks) as well as detect the orientation of the running board 14 relative to objects. Video data captured by video sensor 54 may be red, green, blue (RGB), infrared, depth stream data, or other types of video data. Benefits of utilizing depth stream data is that it can also be utilized to detect distance to objects, such as blocks 20a, 20b.

In some embodiments, sensors include position/orientation sensors 56 that provide data regarding the position and/or orientation of the running board 14. In some embodiments, position sensors are implemented with one or more of satellite navigation systems (e.g., GPS, GLONASS, Galileo, BeiDou, or other global or regional satellite navigation systems), radio-based navigation systems such as LORAN, cellular-based position sensors, and/or other position type sensors. In some embodiments, based on the positional information determined by the position/orientation sensor 56, speed of the running board 14 can be determined. In other embodiments, a dedicated speed sensor is utilized to determine the speed of running board 14.

In some embodiments, position/orientation sensors 56 include one or more inertial sensors (e.g., accelerometer, gyroscope, etc.) capable of detecting orientation (e.g., pitch, yaw, and/or roll) of running board 14. For example, roll is defined as motion/rotation about a longitudinal axis (along the direction of pull rope 24), yaw is defined as motion/rotation about a perpendicular axis (e.g., into the page), and pitch is defined as motion/rotation about a lateral axis (e.g., perpendicular to the longitudinal axis). The pitch, yaw, and/or roll of running board 14 is a function, at least in part, of the force applied to pull rope 24, as compared with the tension applied to conductors 22a, 22b. As a result, the pitch, yaw, and/or roll of running board 14 can be controlled by varying one or more of the pull force applied to pull rope 24 via puller sub-system 16 (shown in FIG. 1), and tension applied to conductors 22a, 22b via tensioner sub-system 12 (shown in FIG. 1). In particular, it is desirable when flying through each of the plurality of blocks 20a, 20b to maintain an orientation that allows running board 14 to enter the block at an orientation that prevents damage to the block and/or increasing the tension on the one or more conductors 22a, 22b (e.g., an orientation aligned with the opening of the block).

In some embodiments, position/orientation sensors 56 are incorporate into a single sensing module. In other embodiments, position/orientation sensors 56 may include a plurality of separate sensors, each configured to collect sensor data and provide the collected sensor data to communication module/antenna 64 for communication to one or more of the communication hub/antenna 26, tensioner sub-system 12, and/or puller sub-system 16 (as shown in FIG. 1).

In some embodiments, running board 14 further includes one or more tension sensors (e.g., tension meter(s) such as one or more load cells) capable of monitoring the tension applied to one or more of the pull rope 24, the running board 14, and/or conductors 22a, 22b. For example, in one embodiment a tension sensor 58 is located on or adjacent to swivel 50 to monitor the tension applied by pull rope 24 to running board 14. Additional tension sensors 60a, 60b may be located on or adjacent to conductor connectors 52a, 52b to monitor the tension applied to conductors 22a, 22b, respectively. One of the benefits of monitoring tension applied to conductors 22a, 22b is that it creates a record of tension applied to the respective conductors throughout the conductor pull operation, including average tension applied, maximum tension applied, etc. Tension data collected by the one or more tension sensors is provided to communication module/antenna 64 for communication to one or more of the communication hub/antenna 26, tensioner sub-system 12, and/or puller sub-system 16 (as shown in FIG. 1).

In some embodiments, running board 14 includes one or more proximity sensors configured to detect the proximity of objects (e.g., the plurality of blocks 20a, 20b) and/or detect running board passing through one or more of the plurality of blocks 20a, 20b. For example, as discussed above with respect to embodiments of block 20a described with respect to FIG. 2A, both the block 20a, 20b and running board 14 may include RFID tags and readers. For example, in one embodiment each of the plurality of blocks is configured with an RFID tag uniquely identifying the block. Running board 14 is configured with an RFID tag reader that is capable of reading the RFID tag when running board 14 travels through the block. In this way, running blocks can provide status updates each a block is "cleared".

In some embodiments, running board 14 includes one or more sensors capable of monitoring operational parameters of the conductor pull operation. The monitored data is communicated to one or more of the tensioner sub-system 12, the puller sub-system 16, and/or the communication hub/antenna 26. Sensor data provided by the running board 14 may further include sensor data collected by the one or more blocks 14, which is communicated to running board 14 as the running board travels through each respective block.

Figure 3:
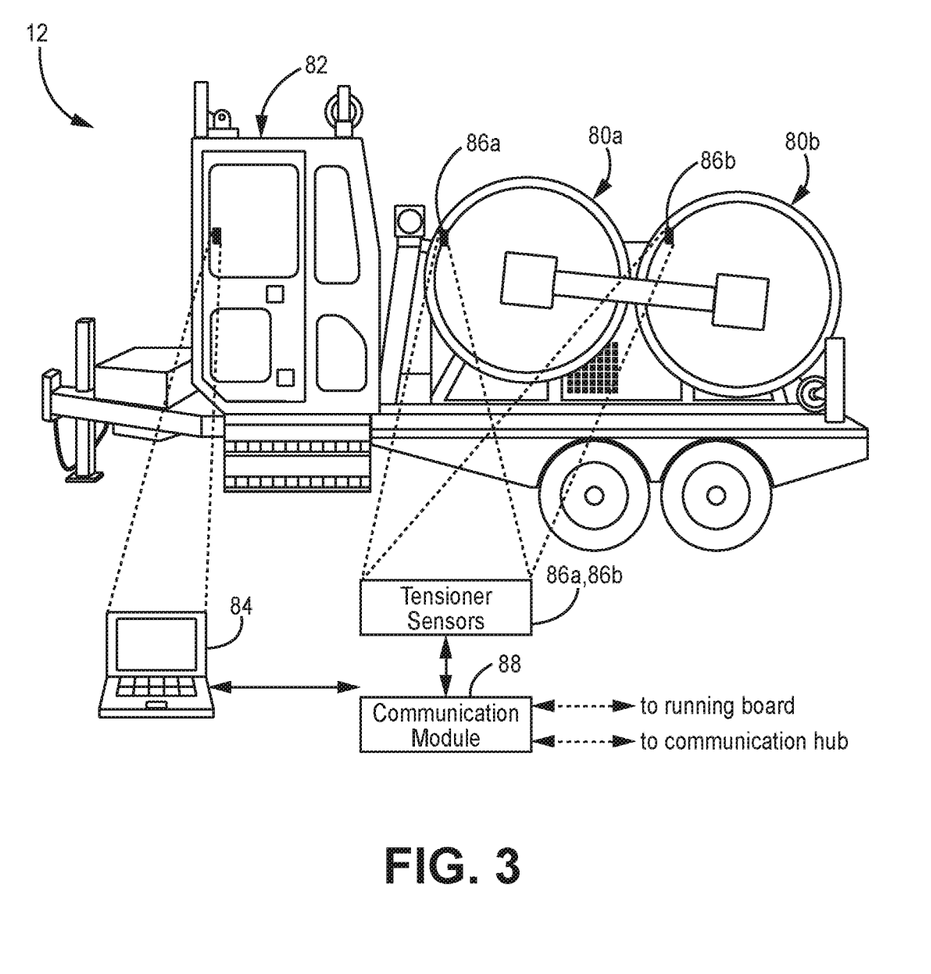
FIG. 3 is a side view of tensioner system that includes one or more sensors, a communication module, and/or computer for displaying sensor data received from the one or more sensors located locally on the tensioner system or remotely.

FIG. 3 is a side view of tensioner sub-system 12 that includes one or more tensioners 80a, 80b and control module 82. Tensioners 80a and 80b are configured to unspool the conductors 22a, 22b being pulled by running board 14. In particular, tensioners 80a and 80b apply tension to the respective conductors, wherein the tension applied opposes the pull force applied by the puller sub-system 16 such that conductors 22a. 22b are slowly unspooled from tensioners 80a, 80b, respectively. In some embodiments, an operator/technician located in control module/panel 82 is able to selectively control tensioners 80a and 80b to individually control the tension applied to conductors 22a and 22b, respectively. In some embodiments, control module/panel 82 automatically control tensioners 80a and 80b to individually control the tension applied to conductors 22a and 22b, respectively.

In some embodiments, tensioner sub-system 12 further includes a plurality of sensors for monitoring one or more local attributes of the conductor pull operation. For example, in some embodiments, tensioner sub-system 12 includes tensioner sensors 86a, 86b associated with tensioners 80a, 80b, respectively, to monitor the tension applied to each of the plurality of conductors 22a, 22b. In some embodiment, tensioner sub-system 12 includes additional sensors such as induced voltage sensors associated with each of the conductors 22a. 22b to monitor for voltages induced during the pull operation. Sensor data collected by tensioner sub-system 12 may be provided to control module 82 for use locally, and may further be provided via communication module 88 to communication hub 26 for aggregation of all sensor data and/or to puller sub-system 16 directly to aid in control operations.

In the embodiment shown in FIG. 3, an operator/technician located within control module 82 controls the operation of tensioner sub-system 12, including the tension applied to conductors 22a. 22b via tensioners 80a, 80b. In some embodiments, control module 82 includes a display that allows a technician/operator to monitor in real-time sensor data provided by one or more of the tensioner sub-system 12, running board 14, puller sub-system 16, communication hub/antenna 26 (shown in FIG. 1), and/or one or more of the plurality of blocks 20. In other embodiments, a mobile device 84 (e.g., tablet, laptop, smartphone, etc.) is connected via communication module 88 to receive in real-time sensor data provided by one or more of the tensioner sub-system 12, running board 14, communication hub/antenna 26 (shown in FIG. 1), and/or one or more of the plurality of blocks 20. A technician/operator associated with control module 82 monitors the received sensor data via a display included as part of control module 82 or via the mobile device 84 to monitor the conductor pull operation and/or control the tension applied by the one or more tensioners 80a, 80b to control aspects of the conductor pull operation (e.g., running board orientation, speed, etc.).

Figure 4:
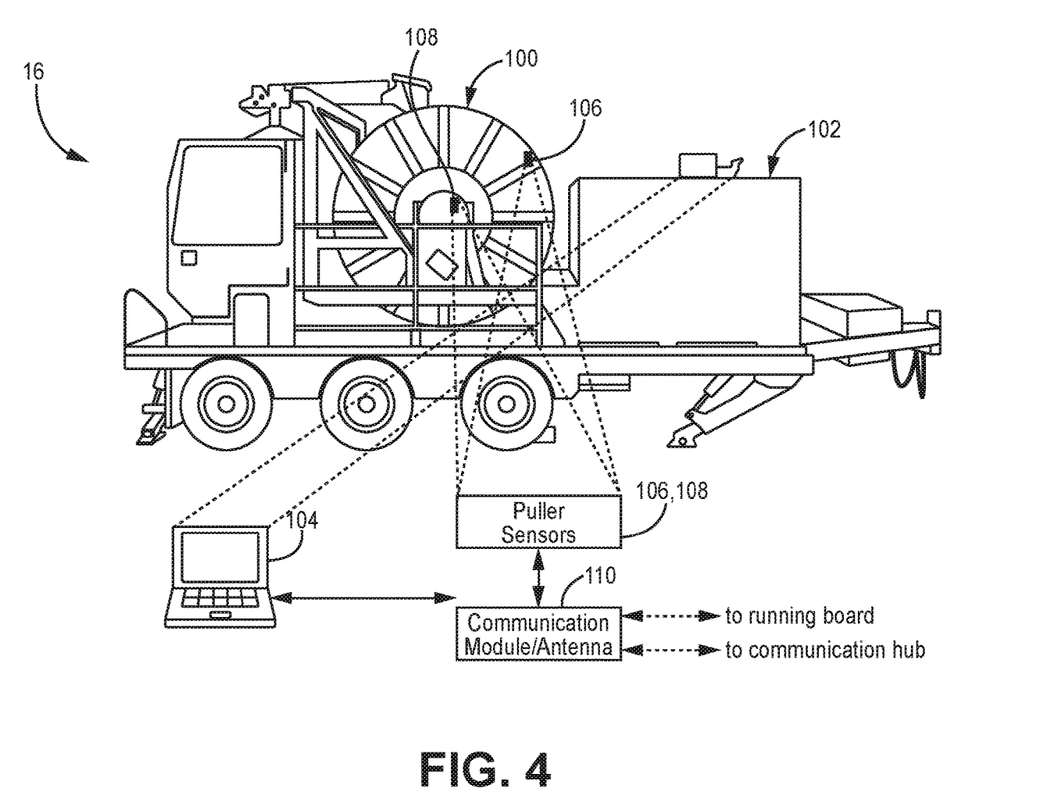
FIG. 4 is a side view of puller system that includes one or more sensors, a communication module, and/or computer for displaying sensor data received from the one or more sensors located locally on the puller system or remotely.

In some embodiments, the sensor data received from one or more of the running board 14, tensioner sub-system 12, puller sub-system 16, and/or plurality of blocks 20a, 20b is displayed to a technician/operator to review. Based on the monitored sensor data, the technician/operator controls the operation of tensioner sub-system 12 manually. In other embodiments, the sensor data is processed—either locally by an onboard controller associated with control module 82 or remotely—and automatically adjusts the operation of tensioner sub-system 12. As discussed above, tensioner sub-system 12 controls the tension applied to the one or more conductors 22a, 22b. In addition, the orientation (e.g., pitch, yaw, roll) of running board 14 is a function of tension applied to the one or more conductors 22a, 22b, and can therefore be modified by controlling the tension applied to conductors 22a, 22b, respectively. For example, as the running board 14 approaches one or more of the plurality of blocks 20a. 20b, a control instruction may be provided to tensioner sub-system 12 (as well as puller sub-system 16) to reduce the speed of running board 14. The control instruction may automatically control the operation of tensioner sub-system 12, or may simply display information to the operator for implementation by the operator/technician. In another example, if the orientation of running board is not properly aligned with the orientation of the gate/opening within one of the plurality of blocks 20a, 20b, a control instruction may be provided that indicates an increase and/or decrease in tension that should be applied to tensioner 80a, tensioner 80b, or both tensioner 80a and 80b to modify the orientation of the running board as desired. In some embodiments, the decision of whether to increase the tension on one conductor, or decrease the tension on the opposite conductor to change the orientation of the running board 14 depends on the tension currently being provided by each respective tensioner 86a, 86b, respectively. This information may be provided by sensors 86a, 86b associated with tensioners 80a, 80b, respectively, or may be provided by sensors located on running board 14, or a combination. For example, if the tension being applied to conductor 22a is greater than a threshold, then rather than increasing the tension on conductor 22a, the tension is decreased on conductor 22b. Similarly, if the tension being applied to conductor 22a is less than a threshold, then it may be acceptable to simply increase the tension on conductor 22a. In other embodiments, as running board 14 approaches one of the plurality of blocks 20a. 20b, tension may be increased on both conductors 22a. 22b in order to pitch up the running board 14 in order to allow the running block to traverse the block more easily. In addition, tension may be adjusted on one or more of the conductors 22a. 22b to allow the running board to "bank" to better navigate angles, avoid objects, etc. As discussed above, this type of control may be implemented automatically in response to received sensor data, may be provided as a suggestion to the operator/technician for review, or may be provided as raw data for the operator/technician to review and make control decisions. FIG. 4 is a side view of puller system that includes a puller spool 100 and control module 102. Puller spool 100 is utilized to spool pull rope 24 utilized during the conductor pull operation, and includes a motor that applies a pulling force. In this way, the pull force applied by puller spool 100 pulls running board through the plurality of blocks 20a. 20b during the conductor pull operation. The force applied by the puller spool 100 is opposed by the tension forces provided by the one or more tensioners 80a. 80b (shown in FIG. 3). An operator/technician located at control panel 102 selectively controls the pull force applied by puller spool 100, thereby controlling the speed at which running board travels.

In some embodiments, puller sub-system 16 further includes a plurality of sensors 106 for monitoring one or more local attributes of the conductor pull operation. For example, in some embodiments, the plurality of sensors 106, 108 includes one or more of speed sensors, pulling force sensors, induced voltage sensors, temperature sensors (for monitoring motor temperature) and/or pulling line sensors. Sensor data collected by puller sub-system 16 may be provided to control panel 102 for use locally in controlling the operation of puller sub-system 16 and may further be provided via communication module/antenna 110 to communication hub 16 for aggregation of all sensor data and/or to tensioner sub-system directly to aid in control operations.

In the embodiment shown in FIG. 4, an operator/technician located at control panel 102 controls the operation of puller sub-system 12, including the pull force applied to pull rope 24. In some embodiments, control panel 102 includes a display that allows a technician/operator to monitor in real-time sensor data provided by one or more of the running board 14, communication hub/antenna 26 (shown in FIG. 1), puller sub-system 16, tensioner sub-system 12 and/or one or more of the plurality of blocks 20. In other embodiments, a mobile device 104 (e.g., tablet, laptop, smartphone, etc.) is connected via communication module 110 to receive in real-time sensor data provided by one or more of the running board 14, puller sub-system 16, communication hub/antenna 26 (shown in FIG. 1), tensioner sub-system 12, and/or one or more of the plurality of blocks 20. A technician/operator associated with control panel 102 monitors the received sensor data via a display included as part of control panel 102 or via the mobile device 104 to monitor the conductor pull operation and/or control the pull force applied by the one or more pull spool 100 to control aspects of the conductor pull operation (e.g., running board speed).

In some embodiments, the sensor data received from one or more of the running board 14, tensioner sub-system 12, puller sub-system 16, and/or plurality of blocks 20a, 20b is displayed to a technician/operator to review. Based on the monitored sensor data, the technician/operator controls the operation of puller sub-system 16 manually. In other embodiments, the sensor data is processed—either locally by an onboard controller associated with control panel 102 or remotely—and automatically adjusts the operation of puller sub-system 16. As discussed above, puller sub-system 16 controls the speed at which the running board is pulled through the plurality of blocks. Control may include reducing the force applied by puller spool 100 in order to reduce the travel speed of running board 14 as running board 14 approaches one or more of the plurality of blocks 20a, 20b or other objects.

In addition, sensor data collected by pulling sub-system 16 may be provided to communication module/antenna 110 for communication to other components of the system, such as tensioner sub-system 12, communication hub/antenna 26 (shown in FIG. 1), or others. In particular, communication of locally sensed parameters (e.g., pull force) with tensioner sub-system 12 allows tensioner sub-system 12 or the operator located at tensioner sub-system 12 to take into account changes being made to the operation of puller sub-system 16. For example, if the pull force is being decreased, this may have an effect on the overall tension on conductors 22a, 22b, which may need modification of the tension applied by tensioner sub-system 12.

In some embodiments, integrated communications provided by one or more of running board 14, tensioner system 12, puller system 16 and communication hub/antenna 26 allows for fully automated control during conductor installation. For example, in some embodiments data recorded by one or more sensors employed by the running board 14 related to orientation (e.g., pitch, yaw, and/or roll) are transmitted to one or more of the tensioner system 12 and the puller system 16. In some embodiments, the communication module 88 associated with the tensioner system 12 receives the transmitted sensor data and utilizes the data to automatically adjust the tension applied by the first and second tensioners 80a and 80b, respectively. Likewise, in some embodiments, the communication module 110 associated with the puller system 16 receives the transmitted sensor data and utilizes the data to automatically adjust the pulling force applied by the puller spool 100. In some embodiments, both the tensioner system 12 and the puller system 16 receive at least a portion of the transmitted data (i.e., a first sub-set of sensor data may be received by the tensioner system 12 and a second sub-set of sensor data may be received by the puller system 16), and utilize the received data to automatically control the pull force applied by the pull system 16 and/or the tension applied by the tensioner system 12. For example, in some embodiments sensor data related to pitch, yaw, and/or roll is received at the puller system 16 and the tensioner system 12. Communication modules 88, 110 and computer systems 84, 104 located at the tensioner system 12 and puller system 16, respectively, calculate adjustments to the pulling speed within the puller system 16 and tension settings within the tensioner systems 12 to modify the orientation of the running board 14 relative to a given installation block 20a, 20b, to allow successful navigation of the block. In some embodiments, an operator may provide input in the form of installation settings at any given point during conductor installation. Operator input may be provided locally at the tensioner system 12 and/or the puller system 16 or may be provided remotely by an operator located at the monitoring center/display 30. In some embodiments, based on the sensor data received from the running board 14 and the input provided by the operator, the puller system 16 and/or the tensioner system 12 automatically adjust the pulling speed and/or tension applied by the first and second tensioners.

In some embodiments, data collected by the one or more sensors located on the running board 14 is transmitted to one or both of the tensioner system 12 and puller system 16 for display to an operator. For example, the transmitted data may be displayed on the mobile device 84, 104 associated with the tensioner system and/or puller system, respectively. The operator at the tensioner system and/or puller system utilizes the displayed data to manually adjust the operation of the tensioner system and/or puller system as required. In this embodiment, the intelligent running board 14 is utilized in conjunction with tensioners and/or puller systems that do not include controls integrated with the communication modules and/or mobile devices.

Figure 5:
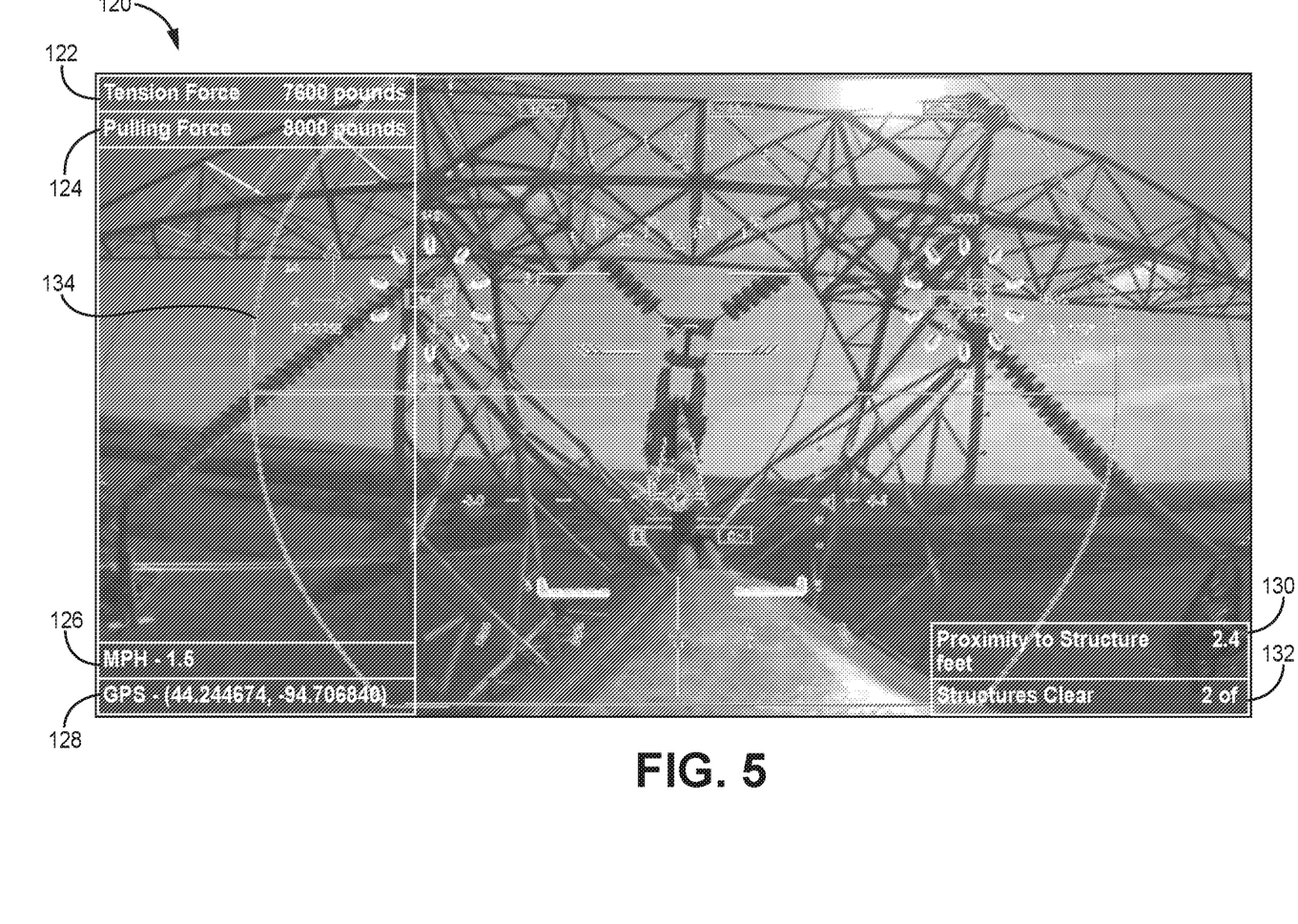
FIG. 5 is a view provided by a video camera mounted on the running board as it approaches a block associated with a transmission pole/tower.

FIG. 5 is a view 120 provided by a video camera mounted on the running board as it approaches a block associated with a transmission pole/tower. Image 120 illustrates running board 14 being pulled by pull rope 24 toward a block 120. The video image here is shown in black and white, but may be in color. Overlaid on top of the image 120 is a plurality of sensor data collected from one or more of the sensors located on tensioner sub-system 12, running board 14, one or more of the plurality of blocks 20a. 20b, and/or puller sub-system 16. For example, in the embodiment shown in FIG. 5, sensor data includes tension force 122, pulling force 124, orientation display 134, running board speed 126, running board location 128, proximity to structure 130, and number of structures cleared 132. In other embodiments, additional sensor data collected from one or more sources may be overlaid on image 120. As discussed above, some of the data is provided by running board 14, such as the running board speed 126, running board location 128, proximity to structure 130 and structures cleared 132. Other data, such as tension force 122 is measured by tensioner sub-system 12, while pulling force 124 is measured by puller sub-system 16. In this way, the display shown in FIG. 5 displays data from a plurality of sources so that an operator/technician can quickly and easily make use of it. In some embodiments, the display is provided to an operator/technician located at one of the tensioner sub-system 12, the puller sub-system 16, or to operators located at both the tensioner sub-system 12 and puller sub-system 16. Based on the real-time information displayed, the operator controls the operation of the tensioner sub-system 12, puller sub-system 16, or both. In other embodiments, the display shown in FIG. 5 is provided to a monitoring center/display 30 (shown in FIG. 1) remotely located from both the tensioner sub-system 12 and puller sub-system 16, wherein an operator/manager can monitor the conductor pull operation in real time. In addition, in other embodiments rather than monitor the conductor pull operation in real-time, the image illustrated in FIG. 5 along with the sensor data overlaid on top of the image is captured and stored by storage device 28 (shown in FIG. 1) for subsequent review of the conductor pull operation.

In some embodiments, sensor data is collected and stored in a database, wherein the collected sensor data can be queried and analyzed. For example, in one embodiment sensor data collected from running board 14 includes one or more of running board location, conductor tension, orientation, speed, proximity to next structure, last structure cleared, and induced voltage on the conductors. An exemplary table is shown in Table 1, below, that illustrates the sensor data collected and stored with respect to running board 14. In other embodiments, additional sensor data may be collected from running board 14.

TABLE 1

| Location | Cond. #1 Tension | Cond. #2 Tension | Orientation | Speed | Proximity to Structure | Last Structure Cleared | Ind. Voltage Cond. #1 | Ind. Voltage Cond. #2 |
| --- | --- | --- | --- | --- | --- | --- | --- | --- |

Similarly, in some embodiments sensor data collected from tensioner sub-system 12 includes one or more of conductor tension, pull speed, total length of conductors pulled, induced voltage, and/or engine data. An exemplary table is shown in Table 2, below, that illustrates the sensor data collected and stored with respect to tensioner sub-system 12. In other embodiments, additional sensor data may be collected from tensioner sub-system 12.

TABLE 2

| Cond. #1 Tension | Cond. #2 Tension | Cond. #1 Line Speed | Cond. #2 Line Speed | Cond. #1 Line Footage | Cond. #2 Line Footage | Induced Volt. Cond. #1 | Ind. Voltage Cond. #2 | Engine Data |
| --- | --- | --- | --- | --- | --- | --- | --- | --- |

Similarly, in some embodiment sensor data collected from puller sub-system 16 includes one or more of pull force, line speed, footage of line pulled, and induced voltage. An exemplary table is shown in Table 3, below, that illustrates the sensor data collected and stored with respect to puller sub-system 16. In other embodiments, additional sensor data may be collected from puller sub-system 16.

TABLE 3

| Pull Force | Line Speed | Footage of Line Pulled | Induced Voltage |
| --- | --- | --- | --- |

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of intelligent stringing operation of an electrical conductor comprising:
    evaluating data relevant to the stringing operation of the electrical conductor during approach to a gate or opening of a block through which the electrical conductor is to be installed; and
    adjusting the stringing operation by adjusting at least one of a pulling force provided by a puller sub-system to the electrical conductor or a tension force provided by a tensioner sub-system to the electrical conductor, the puller sub-system and the tensioner sub-system each being configured to at least one of transmit sensor data to, or receive sensor data from, the other of the puller sub-system or the tensioner sub-system,
    wherein the sensor data is generated by at least one of a puller sub-system sensor disposed on the puller sub-system or a tensioner sub-system sensor disposed on the tensioner sub-system.

2. The method of claim 1, wherein evaluating data comprises evaluating data relevant to the stringing operation of a running board in stringing communication with the electrical conductor during approach to the gate or the opening of the block through which the running board is to pass and the electrical conductor is to be installed.

3. The method of claim 2, wherein the data relevant to the stringing operation includes at least proximity data of the running board to the block.

4. The method of claim 3, wherein one or more proximity sensors located on the running board and/or the block provides the proximity data.

5. The method of claim 4, wherein adjusting the stringing operation is fully autonomous.

6. The method of claim 2, wherein the data relevant to the stringing operation includes at least orientation data of the running board and orientation data of the block.

7. The method of claim 6, wherein evaluation of the orientation data provides alignment information related to whether the running board will move unobstructed through the gate or opening of the block.

8. The method of claim 7, wherein adjusting the stringing operation is fully autonomous.

9. The method of claim 2, wherein the running board comprises running board sensors, wherein at least one of the running board sensors comprises a video camera oriented in a direction of travel of the running board, and
    wherein the video camera is configured to provide video data in real time to a monitoring center for display to an operator.

10. The method of claim 9, wherein one or more of the running board sensors are configured to detect one or more of pitch, yaw, and/or roll of the running board.

11. The method of claim 9, wherein one or more of the running board sensors are selected from the group consisting of a position sensor, a speedometer, a tension meter, a proximity sensor, an inertial sensor, and combinations thereof.

12. The method of claim 9, wherein the monitoring center is configured to receive sensor data indicative of one or more conductor parameters related to a stringing operation of the electrical conductor.

13. The method of claim 12, wherein the stringing operation includes:
at least one active stringing period of the active stringing of the electrical conductor, and
at least one non-working period during which the electrical conductor is not actively being strung.

14. The method of claim 13, wherein the sensor data is indicative of one or more conductor parameters related to an active stringing period of a stringing operation.

15. The method of claim 13, wherein the sensor data is indicative of one or more conductor parameters related to a non-working period of a stringing operation.

16. The method of Claim 12, wherein the monitoring center includes a display for real-time presentation of the sensor data.

17. The method of claim 1, wherein the stringing operation has at least a first state and a second state;
wherein adjusting the stringing operation comprises adjusting the stringing operation from the first state to the second state; and
wherein the first state of the stringing operation has a first likelihood of successful electrical conductor installation through the gate or opening of the block, and the second state of the stringing operation has a second likelihood of successful electrical conductor installation through the gate or opening of the block.

18. The method of claim 17, wherein adjusting the stringing operation from the first state to the second state comprises changing the tension force on the electrical conductor during the stringing operation.

19. The method of claim 17, wherein adjusting the stringing operation from the first state to the second state comprises changing the pulling force on the electrical conductor and/or speed of a running board during the stringing operation.

20. The method of claim 17, wherein adjusting the stringing operation comprises stringing the electrical conductor through the gate or opening of the block by subjecting the electrical conductor to the pulling force comprising a dynamic range of pulling forces or the tension force comprising a dynamic range of tension forces during the stringing operation of the electrical conductor.

21. The method of claim 1, wherein adjusting the stringing operation comprises adjusting at least one parameter of the stringing operation to increase a likelihood of successful electrical conductor installation through the gate or opening of the block.

22. The method of claim 21, wherein successful electrical conductor installation through the gate or opening of the block is determined by a level of coincidence between a central axis of the electrical conductor and the central axis of a groove radius of a sheave profile within the block through which the electrical conductor is installed.

23. The method of claim 21, wherein successful electrical conductor installation though the block is determined by the likelihood that a running board connected to the electrical conductor will move unobstructed through the gate or opening of the block.

24. The method of claim 1, wherein adjusting the stringing operation is at least in part manually, by an operator of the puller sub-system and/or tensioner sub-system.

25. The method of claim 1, wherein adjusting the stringing operation is at least in part manually, by an operator of the puller sub-system and/or tensioner sub-system changing the pull and/or tension force on the electrical conductor.

26. The method of claim 1, wherein adjusting the stringing operation is at least in part by an operator distal both the puller sub-system and the tensioner sub-system.

27. The method of claim 26, wherein the operator distal both the puller sub-system and the tensioner sub-system receives the data relevant to the stringing operation of the electrical conductor via a mobile device.

28. The method of claim 1, wherein adjusting the stringing operation is fully autonomous.

29. The method of claim 1, further comprising:
receiving at a monitoring center data relevant to the stringing operation of the electrical conductor during approach of a running board to a gate or opening of a block through which the electrical conductor is to be installed, the stringing operation having at least a first state and a second state;
wherein adjusting the stringing operation comprises adjusting in real-time the stringing operation from the first state to the second state;
wherein the first state of the stringing operation has a first likelihood of successful running board passage through the gate or opening of the block, and the second state of the stringing operation has a second likelihood of successful running board passage through the gate or opening of the block,
wherein in the first state, the stringing operation comprises:
a first operating condition of a puller sub-system located upstream the block and providing a stringing force on the electrical conductor, and
a first operating condition of a tensioner sub-system located downstream the block providing a tension force on the electrical conductor,
wherein in the second state, the stringing operation comprises:
a second operating condition of the puller sub-system, and
a second operating condition of the tensioner sub-system, and
wherein the second likelihood of successful running board passage through the gate or opening of the block is higher than the first likelihood of successful running board passage through the gate or opening of the block.

30. The method of Claim 29, wherein:
the running board comprises one or more running board sensors configured to sense an operating condition of the running board,
the tensioner sub-system comprises one or more tensioner sensors configured to sense the first and the second operating conditions of the tensioner sub-system, and
the monitoring data comprising sensor data from one or more running board sensors and one or more tensioner sensors.

31. The method of claim 29, wherein the puller comprises the monitoring center.

32. The method of claim 29, wherein the tensioner comprises the monitoring center.

33. The method of claim 29, wherein the monitoring center is distal both the puller and the tensioner.

34. The method of claim 30, wherein the adjusting in real-time the stringing operation from the first state to the second state is at least in part by manually, by an operator of the puller sub-system and/or tensioner sub-system.

35. The method of claim 30, wherein the adjusting in real-time the stringing operation from the first state to the second state is at least in part by manually, by an operator of the puller sub-system and/or tensioner sub-system changing the pull and/or tension force on the electrical conductor.

36. The method of claim 30, wherein the adjusting in real-time the stringing operation from the first state to the second state is at least in part by an operator distal both the puller sub-system and the tensioner sub-system.

37. The method of claim 36, wherein the operator distal both the puller sub-system and the tensioner sub-system receives the data relevant to the stringing operation of the electrical conductor via a mobile device.

38. The method of claim 30, wherein the adjusting in real-time the stringing operation from the first state to the second state is fully autonomous.

39. The method of claim 30, wherein the monitoring center is configured to receive the monitoring data, and
wherein the monitoring center is configured to transmit stringing operation data related to the stringing operation for display at one or more of the puller sub-system, the tensioner sub-system, and a mobile device.

40. The method of claim 30, wherein the monitoring center is configured to receive the monitoring data, and
wherein the monitoring center is configured to transmit stringing operation data related to the stringing operation for storage.

41. The method of claim 1; further comprising:
monitoring data relevant to the stringing operation of electrical conductors during approach to and installation through gate or opening of a first block; the first block including at least one sheave, wherein a respective sheave is cooperatively rotatable with a respective electrical conductor of the electrical conductors; the stringing operation having a misaligned state and an aligned state; and
adjusting the stringing operation from the misaligned state to the aligned state;
wherein each electrical conductor has an outer diameter and a central axis;
wherein each sheave has a cooperatively shaped electrical conductor engaging portion configured to seat the electrical conductor in a groove sized and shaped to accommodate a range of electrical conductor outer diameters; the groove having a groove radius with a central axis;
wherein in the misaligned state; the central axis of the electrical conductor and the central axis of the groove radius are not coincident;
wherein in the aligned state; the central axis of the electrical conductor and the central axis of the groove radius are more coincident than in the misaligned state.

42. The method of claim 41, wherein adjusting the stringing operation comprises changing a pulling and/or tension force provided by a puller and/or tensioner configured to pull and/or tension the electrical conductor.

43. The method of claim 41, wherein the stringing operation further comprises the installation of the electrical conductors through at least a gate or opening of a second block spaced apart from the first block.

44. The method of claim 1, further comprising:
evaluating a set of sensor data indicative of one or more conductor parameters collected during the stringing operation; and
determining from the evaluation whether one or more of the conductor parameters falls outside a threshold range.

45. The method of Claim 44, wherein the threshold range is related to tolerances for conductor design and/or the stringing operation of a conductor, outside which is indicative of a failed stringing operation.

46. The method of Claim 44, wherein the conductor parameters are power transmission line parameters; and
wherein the threshold range is related to tolerances for power transmission line design and/or the stringing operation of a power transmission line, outside which is indicative of a failed stringing operation of the power transmission line.

47. The method of Claim 44, wherein:
the conductor parameters comprise power transmission line parameters collected during a stringing operation of the electrical conductor,
inside the threshold range, the power transmission line parameters are indicative of a successful stringing operation of the electrical conductor,
outside the threshold range, the power transmission line parameters are indicative of a failed stringing operation of the electrical conductor, and
the stringing operation includes:
at least one active stringing period of the active stringing of the electrical conductor, and
at least one non-working period during which the electrical conductor is not actively being strung.

48. The method of Claim 47, wherein the threshold range comprises recommendations from the manufacturer of the electrical conductor.

49. The method of Claim 48, wherein collecting the sensor data comprises receiving the sensor data from one or more of:
the puller sub-system configured to provide a pulling force to a pull rope and comprising one or more puller sub-system sensors;
a running board in stringing communication with the pull rope and comprising one or more running board sensors; and
the tensioner sub-system configured to provide tension to the power transmission line in stringing communication with the running board and comprising one or more tensioner sub-system sensors.

50. The method of Claim 47 further comprising collecting the sensor data.

51. The method of Claim 47 further comprising storing the sensor data.

52. The method of Claim 47 further comprising displaying the determination whether the power transmission line parameters fall outside the threshold range.

53. The method of Claim 44 further comprising:
collecting the sensor data indicative of the one or more conductor parameters during the stringing operation; and
storing the sensor data;
wherein outside the threshold range; one or more of the conductor parameters are indicative of a failed stringing operation of the electrical conductor; and
wherein the stringing operation includes:
at least one active stringing period of the active stringing of the electrical conductor; and at least one non-working period during which the electrical conductor is not actively being strung.

54. The method of Claim 53; wherein collecting the sensor data comprises receiving the sensor data from one or more of:
- the puller sub-system configured to provide a pulling force to a pull rope and comprising one or more puller sub-system sensors;
- a running board in stringing communication with the pull rope and comprising one or more running board sensors; and
- the tensioner sub-system configured to provide tension to one or more conductors in stringing communication with the running board and comprising one or more tensioner sub-system sensors.

* * * * *